Nov. 27, 1956   N. E. F. HOLMQVIST ET AL   2,772,319
AUXILIARY DEVICE IN IGNITION SYSTEMS OF COMBUSTION MOTORS
Filed Dec. 28, 1951   3 Sheets-Sheet 1

Nils Evert Fridolf Holmqvist
Stig Per Robert Åkesson
By Richardson, David and Nordon
their ATTYS.

Nov. 27, 1956  N. E. F. HOLMQVIST ET AL  2,772,319
AUXILIARY DEVICE IN IGNITION SYSTEMS OF COMBUSTION MOTORS
Filed Dec. 28, 1951  3 Sheets-Sheet 3

Nils Evert Fridolf Holmqvist
Stig Per Robert Åkesson
INVENTORS
By Richardson, David and Nordon
their ATTYS.

12 # United States Patent Office 2,772,319
Patented Nov. 27, 1956

2,772,319
AUXILIARY DEVICE IN IGNITION SYSTEMS OF COMBUSTION MOTORS

Nils Evert Fridolf Holmqvist and Stig Per Robert Åkesson, Stockholm, Sweden

Application December 28, 1951, Serial No. 263,779

2 Claims. (Cl. 123—148)

The present invention relates to ignition systems of combustion motors, more especially to ignition systems comprising a battery, an ignition coil and a timed circuit breaker, and has as its object to provide means for facilitating the start under hard conditions, particularly in cold weather.

As is well known the lubricating oil in very cold combustion motors is extremely viscous and causes a considerable resistance on the start of the motor. In motors provided with selfstarter this will in turn cause a material increased current consumption of the starting motor as compared with normal conditions, and as besides the capacity of usual starting batteries (e. g. lead accumulators) is rapidly decreasing with falling temperature and the battery in winter is seldom in perfectly full-charged condition the battery voltage may drop by more than 50% at the starting moment. The voltage is particularly low at the end of the compression stroke of each cylinder, that is at the moment the spark is generated if the ignition is adjusted in a normal way. Since the starting battery commonly also is used for the ignition a decrease of the starting battery voltage will reduce the efficiency of the ignition system. A decrease by 50% of the battery voltage will cause a decrease of the magnetic energy imparted to the induction coil by 75%, and in many cases the spark ceases to arise although the battery still is capable of supplying the starting motor with enough current to slowly turn the motor. With regard to erosion of the electrodes of the sparking plugs and production of heat in the primary winding of the ignition coil it is not possible or advisable to dimension the latter so as to warrant a satisfactory spark also under the most unfavorable conditions. Certainly it has been suggested to connect an iron resistor in series with the primary in order to counteract such current variations through the primary of the ignition coil. The compensation cannot possibly be perfect, however, and besides the current consumption during normal operation of the motor is increased. In addition this resistor has shown to be a source of errors since its lifetime is comparably short due to its high working temperature.

It may also be pointed out that a start at a very low temperature requires a voltage on the secondary side of the ignition coil which is much higher than the one required under normal conditions.

The present invention provides an auxiliary device to be used in combination with the ignition system outlined above, which device is operating just at the start of the motor and easily may be so dimensioned and arranged that the generation of satisfactory ignition sparks is secured as long as the self-starter is at all capable of turning the motor so as to pass the critical maximum compression points of the pistons.

The invention is foremost characterised by an inductive coil being connectable in parallel with the primary winding of the ordinary ignition coil.

In a preferred embodiment of the invention the contact members of a vibratory contact device are connected in parallel with the ordinary circuit breaker contact of the distributor.

The invention will be better understood in connection with the accompanying drawings, in which.

Figure 1:
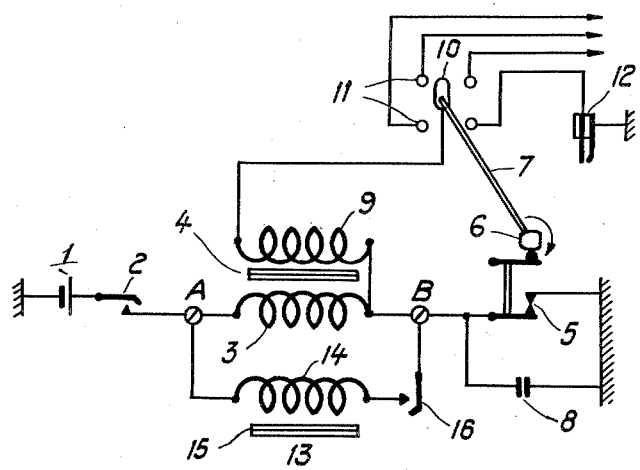
Fig. 1 shows an arrangement according to the invention in its simplest form.

Reverting to Fig. 1 the starting battery is designated 1. The battery 1 has one pole connected to the body and the other pole connected to one terminal of the ignition switch 2, the other terminal of which is connected to the primary winding 3 of the ignition coil 4. On the other side winding 3 is connected to the circuit breaker 5 which completes the circuit extending through winding 3 to the body of the engine. The circuit breaker 5 is in a usual way operated by means of a cam member 6 on the distributor shaft 7, which generally is associated with the cam shaft of the motor. The circuit breaker is shunted by a condenser 8.

The secondary or high tension winding 9 of the ignition coil 4 has one terminal connected to the right terminal of the primary winding 3 and the other terminal connected to the rotor arm 10 of the distributor, which rotor arm also is attached to the distributor shaft 7 and thus is exactly synchronised with the cam member 6. The counter-contacts or electrodes cooperating with distributor arm 10 are designated 11. These are connected with the different spark plugs, one of which is schematically indicated at 12.

All the elements and circuits described above are conventional and their operation is so well-known that it does not seem necessary to describe it in detail.

The new elements according to the invention are in Fig. 1 the auxiliary coil 13 having a winding 14 and a magnetic core 15, and a switch 16. The winding 14 may be connected by means of switch 16, preferably a push button switch, in parallel with the primary 3 of the ignition coil between points A and B, which for instance may be the terminal screws of the ignition coil. If the device is used in a motor car switch 16 may be mounted on the instrument panel while the auxiliary coil 13 may be placed either within the car or inside the hood.

The device operates substantially in the following manner.

When the motor is to be started in very cold weather or when it is observed that the starting motor rotates very slowly the push button 16 is pressed down so that the auxiliary coil 13 is connected in parallel with the primary 3 of ignition coil 4. Coil 13 thus obtains current and gets its energizing circuit broken simultaneously with ignition coil 4 through the circuit breaker contacts 5. When the circuit breaker 5 is opened the breaking voltage induced in winding 14 of auxiliary coil 13 is imparted to the terminals of the primary 3 of ignition coil 4, which voltage is so directed, that it tends to accelerate the current variation in the primary 3, provided the coil 13 is correctly matched to the system. In other words, the condenser 8 will be charged more rapidly and/or to a higher level than normally due to the contribution of current from the auxiliary coil, and the voltage of the condenser in turn determines the time differential of the primary current through the ignition coil. In this way the maximum voltage across the secondary 9 of ignition coil 4 may be materially increased and at least a part of the energy stored in the auxiliary coil 13 may be transferred to the spark via the ignition coil. Although the initiation of the combustion normally is brought about substantially only by the capacitive component of the spark discharge the existence of a fairly great inductive component may in this case be desirable, since, apart from the fact that it serves as a "tension reserve," it heats the electrodes of the sparking plugs, which may cause a local vaporization of fuel condensed on the electrodes. It also would seem that a comparably large current force of the spark may effect some cleaning of the electrodes from impurities and also, in case the normal initiation fails, it may cause ignition by heating high-resistive impurities on the electrodes to glowing temperature.

As to the dimensioning of the auxiliary coil 14 the winding of the latter should have a rather low resistance. In autocars normally battery voltages of 6 or 12 volts are used, and the primary of the ignition coil normally has a resistance of the order of 1.5 and 3 ohms respectively. The resistance of the auxiliary coil should preferably not exceed three times this value in the respective system and a materially lower resistance (e. g. 2 and 1 ohm respectively) value is in most cases favourable provided the inductance can be kept at a sufficiently high value and that the risk of overheating is not too great. That is mainly a question of choosing sufficient dimensions of core and winding space of the auxiliary coil unit. Generally a good result is obtained if the ratio $L_1/R_1^2$ is considerably greater than the ratio $L_2/R_2^2$, $L_1$ and $R_1$ being the inductance and resistance respectively of the auxiliary coil and $L_2$ and $R_2$ being the inductance and resistance respectively of the primary of the ignition coil. In order that the connection of the auxiliary coil shall not instead reduce the efficiency of the ignition coil the former must of course fulfil certain requirements and these may be expressed in the following way.

$$\frac{L_1}{L_2} \geq \frac{1}{\left(\frac{R_2}{R_1}\right)^2 + 2\left(\frac{R_2}{R_1}\right)}$$

$L_1$ and $R_1$ being the inductance and resistance respectively of the auxiliary coil and $L_2$ and $R_2$ being the corresponding magnitudes of the primary of the ignition coil. An extremely good result seems to be obtained if $L_1$ is greater than $L_2$ and $R_1$ smaller than $R_2$. Of course, the core of the auxiliary coil preferably is laminated and it may be open or provided with an air space for preventing harmful saturation and bringing it to operate at an optimum part of its magnetization curve.

In some ignition systems the secondary of ignition coil 4 is connected to the battery side (at terminal A) of the ignition coil. It may be mentioned that the provision of an auxiliary coil according to the invention also is favourable in this case.

For the sake of simplicity the complete ignition system has not been shown in the following Figures 2–7 but have only the terminals A and B in Fig. 1 been shown together with details necessary for the understanding of the description. It is thus presumed that the omitted circuits and elements may be identical with those shown in Fig. 1.

Figure 2:
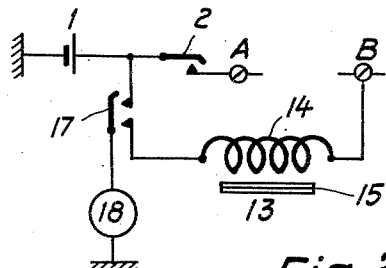
Fig. 2 shows an arrangement similar to that of Fig. 1 but automatically connectable at the operation of the starting switch.

In the embodiment according to Fig. 2 the auxiliary coil 13 is automatically connected and disconnected together with the self-starter. In the figure the starting switch is designated 17 and the starting motor has the reference character 18. To this end the starting switch is a three pole switch interconnecting the battery side terminals of winding coil 14 and starting motor 18 to the battery when operated. This arrangement has the advantage that no special operation is required to connect the auxiliary coil and that the time it is connected is limited to the period during which the battery voltage is decreased due to the current consumption of the starting motor.

Figure 3:
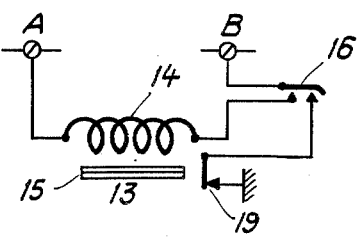
Fig. 3 shows an arrangement according to the invention consisting of an auxiliary coil provided with a self-interruptor contact device connectable in parallel with the circuit breaker of the distributor.

Fig. 3 shows an improved embodiment in which a vibratory contact 19 connectable in parallel with the normal circuit breaker 5 (Fig. 1) is arranged in combination with the auxiliary coil 13. The connection and disconnection of winding coil 14 and contact 19 is effected by means of the three pole switch 16. As will appear from the figure contact 19 operates as a self-breaker contact actuated by the core 15 of the auxiliary coil during the periods the normal circuit breaker 5 is open.

This device operates as follows.

As long as the normal circuit breaker 5 is closed the auxiliary coil 13 obtains steady current through the contact of the circuit breaker. Consequently the coil 13 holds its armature attracted and contact 19 open during this period. At the moment the circuit breaker breaks the circuit a spark amplified by coil 13 will arise with the normal timing as determined by the distributor shaft. As soon as the current through winding coil 14 has sufficiently decreased the armature of the auxiliary coil is released. At the instant contact 19 is closed the coil 13 is again energized so that the circuit is again broken at 19 and thus the device 13, 19 acts as a self-breaker. As will be easily understood the magnetic energy stored during each cycle in the coil 13 will not reach a maximum value unless the operation of contact 19 is somewhat deferred, so that the current through winding 14 manages to reach the maximum value as determined by the battery voltage and the winding resistance before contact 19 breaks the current supply unless the coil 13 has a comparably low time constant. To this end the armature may have a relatively large mass and be arranged to move a comparably long distance on each operation before the break contact 19 is actuated.

It is to be noted that there is a tendency of slow operation on the release due to the fact, that a part of the magnetic energy of the auxiliary coil will not be utilized for charging the condenser but is consumed as resistance losses of a circulating current of reverse direction through the primary of ignition coil 4, which current slows down the decrease of the flux in core 15. To this end the core (or the armature) should be provided with a pole stud or similar spacing member for securing a satisfactory air gap in the attracted position of the armature, which pole stud or corresponding spacing member preferably is made somewhat resilient so as to be charged by the kinetic energy of the armature and thus accelerate it on its release.

It is possible and sometimes advantageous to choose the time constant $L_1/R_1$ of the auxiliary coil equal to or of the same order as the time constant $L_2/R_2$ of the primary of the ignition coil, whereby the self-breaker becomes non-retarded or in every case more rapid in operation than otherwise. Also in the case the auxiliary coil is kept connected when the motor is fast-running it may be advantageous if this requirement is fulfilled. This is true also in the case the auxiliary coil is not provided with any selfbreaker contact. It should be noted, however, that the ratio $L_1/R_1^2$ still shall be kept considerably greater than the ratio $L_2/R_2^2$ for obtaining a great gain in secondary voltage of the ignition coil. In this connection it may be mentioned, that the voltage gain obtained by the auxiliary coil is generally determined by the formula $$\frac{e_{1p}}{e_{0p}} = \frac{1+\frac{R_2}{R_1}}{\sqrt{1+\frac{L_2}{L_1}}}$$

$e_{1p}$ being the peak voltage with the auxiliary coil connected and $e_{0p}$ the peak voltage with the auxiliary coil disconnected.

A suitable frequency of the vibratory movement of contact 19 may for instance be 10 to 50 cycles per second, which low frequency is sufficient for the purpose, as will be described below, and is sufficiently low to permit a full utilization of the energy storing capacity of the auxiliary coil also in cases the latter is rather amply dimensioned. Of course, if suitable, the frequency may be chosen much higher (many hundred cycles) if this would be found desirable.

The purpose of this arrangement is the following.

In a very cold motor there are a great many factors which may influence the prospects of the formation of a spark on one hand and the ignition of the fuel mixture on the other hand. It is by no means sure that these factors cooperate in the most favourable way at the moment the spark as determined by the distributor cam occurs, but the optimum may occur somewhat later. Most ignition systems are adjusted so as to generate the spark when the piston is still on its way upwards and rather close to its highest position, i. e. when the compression is very great. Although the first impulse as timed by the distributor cam often does not result in ignition the possibility is great that any of the succeeding impulses or sparks respectively generated by the self-breaker operation of contact 19 may result in ignition when the piston is on its way downwardly. This self-breaker operation of the contact 19 lasts until the circuit-breaker 5 closes its contacts and sparks may occur as long as the distance between the rotor arm and the respective counter-electrode 11 is not too great to permit a discharge. Possibly the rotor arm 10 may be provided with a peripherical projection extending backwards as counted in its direction of rotation. Another advantage which may be gained with this self-breaker arrangement is that a very great amount of thermic energy is developed on the electrodes of the sparking plugs during each stroke which may cause local vaporization on the electrodes and glow ignition due to heating of impurities on the electrodes of the sparking plugs. Furthermore, the repeated discharges may to some extent clean the sparking plug electrodes.

As soon as the motor starts the frequency of the contact closures caused by circuit breaker 5 will be so high that the armature of auxiliary coil 13 does not manage to release and thus the ignition is timed merely by the distributor cam 6. When the switch 16 is released the auxiliary device is disconnected from the ignition system and the armature of coil 13 is reset to its rest position.

In the embodiment here described it has been presumed that the auxiliary coil 13 has been dimensioned so as to cause a considerable increase of tension and/or spark energy. It should be noted, however, that when a self-breaker device is used advantages may be obtained in certain cases even if the auxiliary coil does not amplify the sparks. During the later part of the upper movement of the piston the battery voltage decreases due to the increased load caused by the compression but on the downward movement the battery voltage may raise again considerably provided the oil is not too viscous. As already mentioned the ignition often occurs somewhat before the piston has reached its top position. If the battery is nearly discharged the starting motor will rotate very slowly, and if the ignition takes place before the piston has reached its top position it may occur, that the starting motor stops. With this in view it may be desirable to retard the ignition considerably, which may be easily effected by the self-breaker device according to Fig. 3 provided the first spark or sparks are suppressed. This result will be achieved simply if the auxiliary coil 13 is so dimensioned that it is unable to give sufficiently high-tensioned impulses during the periods the piston moves upwardly but causes effective sparks when the battery voltage has increased sufficiently during the downward stroke of the piston. The instantaneous value of the battery voltage is thus used as a criterion on the position of the piston. This arrangement is most favourable for start at a fairly normal temperature but when the battery has been too much discharged. It may be suitable, therefore, to arrange a high-efficient auxiliary coil in combination with a connectable and disconnectable damping coil or resitance to be used under the above mentioned conditions for decreasing its efficiency. It may be connected by means of a special switch either in series or parallel with the winding 14 of coil 13.

Figure 4:
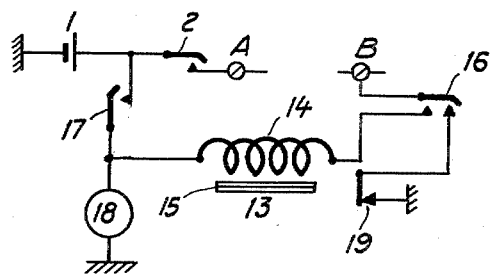
Fig. 4 shows the arrangement of Fig. 3 modified so as to have its operation limited to the periods during which the self-starter is connected to the battery.

In Fig. 4 the arrangement of Fig. 3 is modified so that the time of operation of auxiliary coil 4 is limited to the time the starting motor 18 obtains current by the former having its circuit extending through starting switch 17. Of course, the contacts of switch 16 may be combined with the starting switch 17.

Figure 5:
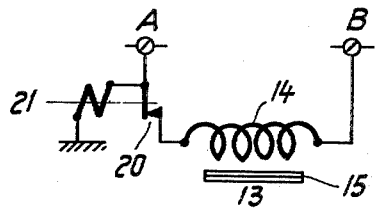
Fig. 5 illustrates an embodiment in which the auxiliary coil is automatically connectable and disconnectable by means of a voltage sensitive relay.

In the arrangement according to Fig. 5 a voltage sensitive relay 21 has its winding connected across the terminals of the battery 1. This relay is so dimensioned that it is normally operated but releases when the battery voltage falls to a value necessitating the connection of the auxiliary coil 13. Upon release of relay 21 the winding 14 of coil 15 is connected by means of break contact 20.

Of course, the auxiliary coil 13 may also in this case be provided with a self-breaker contact for instance as illustrated in Fig. 3 or 4.

Figure 6:
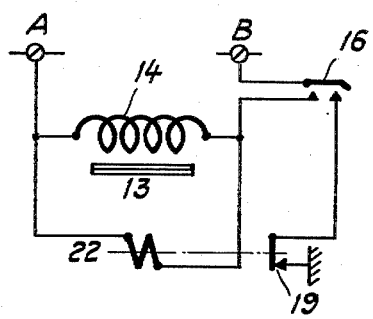
Fig. 6 shows an embodiment of the invention in which the ignition is retarded by means of a voltage sensitive relay.

In Fig. 6 a modified embodiment of the invention is shown in which a separate interruptor 22 is provided having a winding coil connected in parallel with winding 14 of auxiliary coil 13, and a vibratory contact 19. The winding coil of self-breaker or interruptor 22 should preferably be so dimensioned, that it does not decrease the efficiency of auxiliary coil 13 according to the rules stated in connection with Fig. 1.

Figure 7:
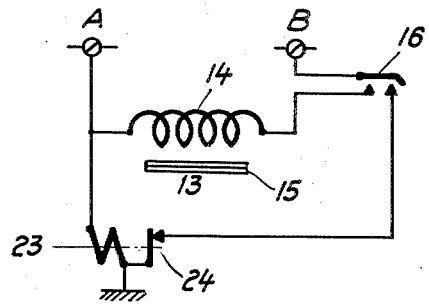
Fig. 7 shows a modification of the arrangement in Fig. 3 in which the vibratory contact device is controlled by a separate magnet coil.

Fig. 7 illustrates a device having a voltage sensitive relay 23 connected or connectable across the terminals of the battery 1 and operating a break contact short circuiting circuit breaker 5. The relay 23 is so dimensioned and arranged that it is normally operated but is released if the battery voltage falls below a very low value and is again operated when voltage on raising has reached this value. It may thus be achieved that the relay is reset if there is a risk that the starting motor would stop if the spark would occur with its normal timing and is again operated on the downward movement of the piston when the voltage raises. The normal break of circuit breaker 5 is thus made ineffective by contact 24, and the spark occurs only when this contact is broken at a later instant. This voltage sensitive "retarding device" may also be used in combination with an auxiliary device having a vibratory contact, for instance as shown in Fig. 3 or 6, and it may also in certain cases be used separately without any auxiliary coil.

Figure 8:
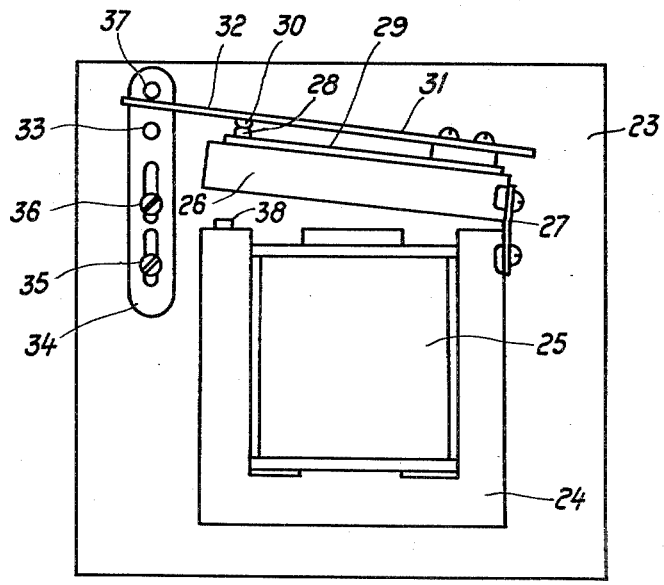
Fig. 8 illustrates a coil structure provided with a self-breaker device.

Fig. 8 shows as an example a possible structural performance of an auxiliary device according to the invention.

The auxiliary coil comprises a base plate or frame 23 having thereon a laminated three-leg core 24 with a winding coil 25. The yoke of the core, which is likewise laminated, is utilized as an armature 26 for operating the aforementioned vibratory contact. The armature is hinged by means of a flat spring piece 27 attached on one hand to the armature 26 and on the other hand to the core 24. A stationary contact member 28 is fixed to a plate 29 being in turn attached to the armature 26 and electrically connecting contact member 28 with the body of the device. The stationary contact member 28 cooperates with a movable contact member 30 on a leaf spring 31 being insulatedly attached to armature 26 and pre-bent so as to press contact member 30 against contact member 28 with a considerable contact pressure in non-operated position of the armature. The contact spring 31 is provided with an extension 32. A stud 33 projecting into the path of movement of extension 32 is mounted on a supporting piece 34, which is secured to the base plate 23 by means of screws 35 and 36 going through oblong holes in order to permit adjustment of the position of stud 33 by sliding supporting piece 34 in its longitudinal direction. The non-operated position of the armature 26 is defined by means of a stud 37. A pole stud or distance member 38 is arranged on one shank of core 24. As already mentioned this pole stud or distance member may be made resilient.

When coil 25 obtains current the armature 26 is attracted and accelerated until the extension 32 is stopped by the stud 33 and the contact members 28 and 30 are separated. Due to the high speed of motion of the armature the break will be very rapid which is very valuable in this case. If the device is connected as a self-breaker the current will be broken when extension 32 reaches stud 33, but the armature continues its movement due to its considerable kinetic energy until it strikes pole stud 38, whereupon it is restored by the combined action of stud 38, spring 27 and spring 31. When the level of stud 33 is reached the contact members 28 and 30 make contact again so that the energizing circuit of coil 25 is closed. Due to its kinetic energy, however, the armature 26 continues its upward movement until extension 32 strikes stud 37 throwing the armature downwards, whereupon the cycle described above is repeated. Of course, it may occur, that either or neither of pole stud 38 or stud 37 are not reached due to special conditions under which the device is operating.

The described structure may be modified by mounting the contact device 28—32 on the base plate 23 in a reversed position relative to armature 26 and by providing the latter with an actuating member corresponding to the stud 33 and possibly also stud 37. This modification has the advantage that the contact pressure will not be influenced by the acceleration of the armature during its downward "free travel." Such an arrangement, however, will be a bit more complicated in manufacture and require some more space, and harmful contact vibrations are satisfactorily prevented in the shown device by the action of stud 37.

Many further modifications may be made within the scope of the inventive idea. Thus, for instance, a glow discharge lamp may be connected or connectable in parallel with the primary of the ignition coil or in parallel with the normal circuit breaker contact, which lamp has its ignition voltage so chosen and possibly is connected with a resistance or impedance element of such a value, that harmful over-tensions are prevented from arising. In addition this lamp may be used for checking the operation of the ignition system and may then be placed on the instrument panel if it is the question of a motorcar.

We claim:

1. An auxiliary device for use in the ignition system of an internal combustion engine having a drive shaft, said ignition system comprising a battery, an ignition coil having a primary winding and a secondary winding, said primary winding being connected to said battery, and a circuit breaker including contacts connected in series with an energizing circuit including said primary winding and said battery and operating in synchronized relation with respect to said drive shaft, said auxiliary device comprising an induction coil including a winding and a core of magnetizable material, said core forming a magnetic path for the flux induced by said winding and comprising portions extending outside said coil for forming a flux return path including an air gap shorter than the length of the magnetic path formed by said core, an armature disposed in proximity to said air gap to be magnetically operable by the magnetic flux traversing said air gap, a break contact operable by said armature, and switching means for connecting said magnetizing winding in parallel with said primary winding of the ignition coil and connecting said break contact in parallel with said contacts of said circuit breaker, the said induction coil being so dimensioned that the ratio of its inductance to the square of its resistance is considerably greater than the ratio of the inductance of said primary winding of said ignition coil to the square of the resistance thereof.

2. A device as claimed in claim 1, wherein the ratio of inductance to the resistance of the winding of said induction coil is substantially equal to the corresponding ratio for the primary winding of the ignition coil.

References Cited in the file of this patent

UNITED STATES PATENTS

| | | |
|---|---|---|
| 5,507 | Horn | Apr. 11, 1848 |
| 1,261,744 | Dady | Apr. 2, 1918 |
| 1,302,847 | Putt | May 6, 1919 |
| 1,693,210 | Von Lepel | Nov. 27, 1928 |
| 2,044,155 | Dibley | June 16, 1936 |
| 2,090,365 | Harris | Aug. 17, 1937 |
| 2,443,060 | Wall | June 8, 1948 |
| 2,453,910 | Heal | Nov. 16, 1948 |